(12) United States Patent
Sun et al.

(10) Patent No.: US 12,149,874 B2
(45) Date of Patent: Nov. 19, 2024

(54) NETWORK CONTROL METHOD, APPARATUS, AND SYSTEM

(71) Applicant: HUAWEI TECHNOLOGIES CO., LTD., Guangdong (CN)

(72) Inventors: Changsheng Sun, Nanjing (CN); Baiming Yang, Nanjing (CN); Dong Wang, Beijing (CN); Fengmei Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 17/532,932

(22) Filed: Nov. 22, 2021

(65) Prior Publication Data

US 2022/0086545 A1 Mar. 17, 2022

Related U.S. Application Data

(63) Continuation of application No. PCT/CN2020/091797, filed on May 22, 2020.

(30) Foreign Application Priority Data

May 22, 2019 (CN) .......................... 201910426714.1

(51) Int. Cl.
*H04Q 11/00* (2006.01)
*H04B 10/032* (2013.01)
(Continued)

(52) U.S. Cl.
CPC ....... *H04Q 11/0071* (2013.01); *H04B 10/032* (2013.01); *H04J 14/0287* (2013.01);
(Continued)

(58) Field of Classification Search
None
See application file for complete search history.

(56) References Cited

U.S. PATENT DOCUMENTS

| | | | |
|---|---|---|---|
| 9,369,785 B1 | 6/2016 | Schmidtke et al. | |
| 2008/0002664 A1* | 1/2008 | Li | H04L 45/04 370/351 |

(Continued)

FOREIGN PATENT DOCUMENTS

| | | |
|---|---|---|
| CN | 101677294 A | 3/2010 |
| CN | 103491002 A | 1/2014 |

(Continued)

*Primary Examiner* — Li Liu
(74) *Attorney, Agent, or Firm* — James Harrison

(57) ABSTRACT

This disclosure provides a network control method, an apparatus, and a system, to manage an IP network and an optical network together, thereby properly controlling use of resources of an entire network. The method includes: obtaining first link state information and second link state information, where the first link state information is used to indicate a link state of an Internet Protocol IP network, and the second link state information is used to indicate a link state of an optical network; determining third link state information based on the first link state information and the second link state information, where the third link state information includes the link state of the IP network and the link state of the optical network; and computing a path based on the third link state information.

16 Claims, 5 Drawing Sheets

(51) Int. Cl.
*H04J 14/02* (2006.01)
*H04L 12/46* (2006.01)

(52) U.S. Cl.
CPC .. *H04L 12/4633* (2013.01); *H04Q 2011/0073* (2013.01); *H04Q 2011/0079* (2013.01); *H04Q 2011/009* (2013.01)

(56) References Cited

U.S. PATENT DOCUMENTS

| | | | |
|---|---|---|---|
| 2015/0003283 A1* | 1/2015 | Previdi | H04L 45/50 370/254 |
| 2015/0063802 A1* | 3/2015 | Bahadur | H04L 47/829 398/49 |
| 2016/0234578 A1* | 8/2016 | Sareen | H04L 45/124 |
| 2016/0241469 A1* | 8/2016 | Iizawa | H04L 45/64 |
| 2018/0041423 A1* | 2/2018 | He | H04L 49/70 |
| 2019/0140949 A1* | 5/2019 | Wu | H04J 14/0272 |
| 2019/0379953 A1* | 12/2019 | Yuang | H04Q 11/0005 |
| 2023/0083867 A1* | 3/2023 | D'Ippolito | H04L 41/5051 |

FOREIGN PATENT DOCUMENTS

| | | | |
|---|---|---|---|
| CN | 103746841 A | 4/2014 | |
| CN | 106850424 * | 6/2017 | ........... H04L 12/707 |
| CN | 106850424 A | 6/2017 | |
| CN | 108092733 A | 5/2018 | |
| CN | 109005473 A | 12/2018 | |
| EP | 2843888 A1 | 3/2015 | |
| JP | 2009049560 A | 3/2009 | |
| WO | 2015059917 A1 | 4/2015 | |

\* cited by examiner

500

| Obtain first link state information and second link state information, where the first link state information is used to indicate a link state of an internet protocol IP network, and the second link state information is used to indicate a link state of an optical network | ∼ S510 |

| Determine third link state information based on the first link state information and the second link state information, where the third link state information includes the link state of the IP network and the link state of the optical network | ∼ S520 |

| Compute a path based on the third link state information | ∼ S530 |

FIG. 5

NETWORK CONTROL METHOD, APPARATUS, AND SYSTEM

CROSS-REFERENCE TO RELATED APPLICATIONS

This application is a continuation of International Application No. PCT/CN2020/091797, filed on May 22, 2020, which claims priority to Chinese Patent Application No. 201910426714.1, filed on May 22, 2019. The disclosures of the aforementioned applications are hereby incorporated by reference in their entireties.

TECHNICAL FIELD

This disclosure relates to the communications field, and in particular, to a network control method, an apparatus, and a system in the communications field.

BACKGROUND

A telecommunications backbone network generally is planned, constructed, and managed in a layered manner based on an Internet Protocol (IP) network and an optical network. A layer at which the IP network is located may be referred to as an IP layer, and a layer at which the optical network is located may be referred to as an optical layer. For a long time, different technical routes are used for the IP layer and the optical layer, and the IP layer and the optical layer are unaware of each other and are independently developed for a long time. The IP layer may be used as a load of the optical layer. The optical layer may be used as a pipeline of the IP layer. Software defined networking (software defined networking, SDN) still inherits a conventional layered idea, and an IP network controller and an optical network controller are constructed, to respectively control an IP layer dynamic network and an optical layer dynamic network.

Specifically, the IP network controller collects an IP layer dynamic topology by using a protocol such as border gateway protocol link-state (Border Gateway Protocol link-state, BGP-LS), and computes and establishes an IP layer tunnel by using a protocol such as a path computation element protocol (path computation element protocol, PCEP). The optical network controller collects an optical layer dynamic topology by using a protocol such as a generalized multiprotocol label switching (generalized multiprotocol label switching, GMPLS) protocol, and computes and establishes an optical layer tunnel by using protocols such as the PCEP and the GMPLS.

On an actual physical network, an IP network and an optical network are one connected topology and carry almost same service traffic. If two network controllers perform layered management on one network, no proper communication tunnel can be obtained. This may cause problems such as a protection failure and a waste of an optical layer resource.

SUMMARY

This disclosure provides a network control method, an apparatus, and a system, to manage an IP network and an optical network together, thereby properly controlling use of resources of an entire network.

According to a first aspect, a network control method is provided, including: obtaining first link state information and second link state information, where the first link state information is used to indicate a link state of an IP network, and the second link state information is used to indicate a link state of an optical network; determining third link state information based on the first link state information and the second link state information, where the third link state information includes the link state of the IP network and the link state of the optical network; and computing a path based on the third link state information.

According to the network control method in this embodiment of this disclosure, the link state information of the IP network and the link state information of the optical network are combined, and a master controller performs management together, to facilitate the master controller in properly planning a path, thereby properly controlling use of resources of an entire network, and helping resolve problems of a protection failure and a resource waste.

Optionally, the link state information may be stored in a link state database. For example, the first link state information may be stored in a first link state database, and the second link information may be stored in a second link state database. The computing a path may specifically include: computing a tunnel path. However, this is not limited in this embodiment of this disclosure.

With reference to the first aspect, in some implementations of the first aspect, the link state of the IP network includes a network topology of the IP network, and the link state of the optical network includes a network topology of the optical network.

With reference to the first aspect, in some implementations of the first aspect, the obtaining first link state information and second link state information includes: receiving the first link state information from an IP network controller; and receiving the second link state information from an optical network controller.

Optionally, the IP network controller, the optical network controller, and the master controller may be separately deployed, for example, deployed in three different devices. In this case, an extensible protocol needs to be deployed between the IP network controller and the master controller, and between the optical network controller and the master controller, so that the master controller obtains link state information and existing tunnel information, and the IP network controller and the optical network controller obtain the respective link state information and existing tunnel information of respective layers.

Optionally, the IP network controller, the optical network controller, and the master controller may be deployed together, for example, deployed in a same device. In this case, the IP network controller and the master controller obtain information about each other only by using an internal software function interface of a system, the optical network controller and the master controller obtain information about each other only by using an internal software function interface of the system, and no other extensible protocol needs to be deployed.

With reference to the first aspect, in some implementations of the first aspect, the computing a path based on the third link state information includes: computing the tunnel path based on the third link state information; and the method further includes: establishing a tunnel based on the tunnel path.

Specifically, after computing the tunnel path, the master controller needs to send information about the tunnel path to the networks (the IP network and the optical network), to ensure information synchronization between the networks and the master controller. Optionally, if the IP network controller and the optical network controller exist, the master controller may send the tunnel path to the IP network controller and the optical network controller, and the IP network controller and the optical network controller establish respective tunnels.

With reference to the first aspect, in some implementations of the first aspect, the method further includes: obtaining existing tunnel information; the computing a path based on the third link state information includes: computing the tunnel path based on the third link state information and the existing tunnel information; and the method further includes: performing tunnel rerouting and/or tunnel optimization based on the tunnel path and the existing tunnel information.

Further, the master controller may obtain the existing tunnel information, compute a new tunnel path with reference to the existing tunnel information, and perform tunnel rerouting and/or tunnel optimization on the existing tunnel. When the IP network controller, the optical network controller, and the master controller may be separately deployed, that the master controller obtains the existing tunnel information may be: separately obtaining the existing tunnel information of the IP network by using the IP network controller and obtaining the existing tunnel information of the optical network by using the optical network controller. In this embodiment of this disclosure, the existing tunnel information of the IP network and the existing tunnel information of the optical network may be collectively referred to as the existing tunnel information, and a name of the existing tunnel information is not limited in this embodiment of this disclosure.

According to a second aspect, an apparatus is provided, including: an obtaining unit, configured to obtain first link state information and second link state information, where the first link state information is used to indicate a link state of an IP network, and the second link state information is used to indicate a link state of an optical network; and a processing unit, configured to determine third link state information based on the first link state information and the second link state information, where the third link state information includes the link state of the IP network and the link state of the optical network; and compute a path based on the third link state information.

With reference to the second aspect, in some implementations of the second aspect, the link state of the IP network includes a network topology of the IP network, and the link state of the optical network includes a network topology of the optical network.

With reference to the second aspect, in some implementations of the second aspect, the obtaining unit is specifically configured to receive the first link state information from an IP network controller; and receive the second link state information from an optical network controller.

With reference to the second aspect, in some implementations of the second aspect, the processing unit is further configured to compute a tunnel path based on the third link state information; and establish a tunnel based on the tunnel path.

With reference to the second aspect, in some implementations of the second aspect, the obtaining unit is further configured to obtain existing tunnel information; and the processing unit is specifically configured to compute a tunnel path based on the third link state information and the existing tunnel information; and perform tunnel rerouting and/or tunnel optimization based on the tunnel path and the existing tunnel information.

In a design, the apparatus is a communications chip, and the communications chip may include an input circuit or interface, configured to send information or data, and an output circuit or interface, configured to receive information or data.

In another design, the apparatus is a communications device, and the communications device may include a transmitter, configured to send information or data, and a receiver, configured to receive information or data.

According to a third aspect, another apparatus is provided, including a processor and a memory. The memory is configured to store a computer program, and the processor is configured to invoke the computer program from the memory and run the computer program, to enable the apparatus to perform the method in either of the foregoing aspects and any possible implementation of the aspect.

Optionally, there are one or more processors, and there are one or more memories.

Optionally, the memory may be integrated with the processor, or the memory and the processor are separately disposed.

Optionally, the apparatus further includes an output interface and an input interface.

Optionally, the apparatus further includes a transmitter and a receiver.

According to a fourth aspect, a system is provided, including: an IP network, including IP network elements; an optical network, including optical network elements; a cross-layer link, configured to connect the IP network element and the optical network element; and a master controller, configured to obtain first link state information and second link state information, where the first link state information is used to indicate a link state of the IP network, and the second link state information is used to indicate a link state of the optical network; determine third link state information based on the first link state information and the second link state information, where the third link state information includes the link state of the IP network and the link state of the optical network; and compute a path based on the third link state information.

With reference to the fourth aspect, in some implementations of the fourth aspect, the link state of the IP network includes a network topology of the IP network, and the link state of the optical network includes a network topology of the optical network.

With reference to the fourth aspect, in some implementations of the fourth aspect, the system further includes: an IP network controller, configured to collect the first link state information in real time, and send the first link state information to the master controller; and an optical network controller, configured to collect the second link state information in real time, and send the second link state information to the master controller, where the master controller is specifically configured to receive the first link state information from the IP network controller; and receive the second link state information from the optical network controller.

With reference to the fourth aspect, in some implementations of the fourth aspect, the master controller is further configured to compute a tunnel path based on the third link state information; and establish a tunnel based on the tunnel path.

With reference to the fourth aspect, in some implementations of the fourth aspect, the master controller is further configured to obtain existing tunnel information; compute a tunnel path based on the third link state information and the existing tunnel information; and perform tunnel rerouting and/or tunnel optimization based on the tunnel path and the existing tunnel information.

According to a fifth aspect, a computer program product is provided. The computer program product includes a computer program (alternatively referred to as code or an instruction), and when the computer program is run, a computer is enabled to perform the method in any possible implementation of any aspect.

According to a sixth aspect, a computer-readable medium is provided. The computer-readable medium stores a computer program (alternatively referred to as code or an instruction), and when the computer program is run on a computer, the computer is enabled to perform the method in any possible implementation of any aspect.

According to a seventh aspect, a chip system is provided, including a memory and a processor. The memory is configured to store a computer program, and the processor is configured to invoke the computer program from the memory and run the computer program, to enable a communications device, in which the chip system is mounted, to perform the method in any possible implementation of any aspect.

The chip system may include an input circuit or interface, configured to send information or data, and an output circuit or interface, configured to receive information or data.

BRIEF DESCRIPTION OF DRAWINGS

FIG. 5 is a schematic flowchart of a network control method according to this disclosure;

DESCRIPTION OF EMBODIMENTS

The following describes technical solutions of this disclosure with reference to accompanying drawings.

Figure 1:
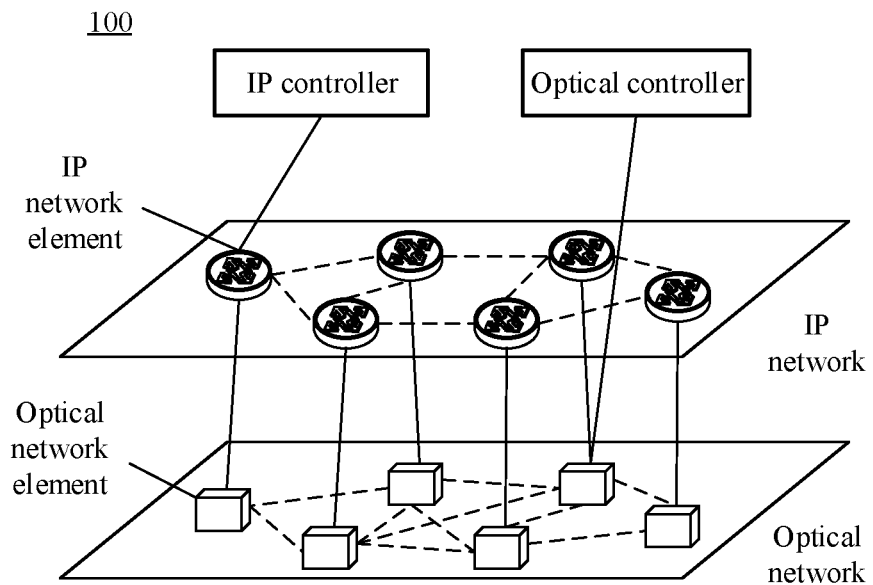
FIG. 1 is a schematic diagram of an existing system architecture.

FIG. 1 is a schematic diagram of an existing system architecture 100. The system architecture 100 may be understood as a telecommunications backbone network. The telecommunications backbone network shown in FIG. 1 generally is planned, constructed, and managed in a layered manner based on an IP network and an optical network. A layer at which the IP network is located may be referred to as an IP layer, and a layer at which the optical network is located may be referred to as an optical layer. As shown in FIG. 1, the IP network includes a plurality of IP network elements, the optical layer may include a plurality of optical network elements, and an IP network element and an optical network element are connected by using a cross-layer link.

For example, the IP network element may be a switch, a router, a gateway GPRS support node (gateway GPRS support node, GGSN), a serving GPRS support node (serving GPRS support node, SGSN), a service gateway, or the like. GPRS is general packet radio service (general packet radio service). The optical network element may be an optical transport network (optical transport network, OTN) device, a wavelength division multiplexing (wavelength division multiplexing, WDM) device, or the like. If the optical network is further divided into an optical layer and an electrical layer, the OTN device may be deployed at the electrical layer of the optical network, and the WDM device may be deployed at the optical layer of the optical network.

For a long time, different technical routes are used for the IP layer and the optical layer, and the IP layer and the optical layer are unaware of each other and are independently developed for a long time. The IP layer may be used as a load of the optical layer. The optical layer may be used as a pipeline of the IP layer. In other words, a long-distance connection between IP network elements at the IP layer is implemented by using a tunnel established between optical network elements at the optical layer. Software defined networking (software defined networking, SDN) still inherits a conventional layered idea, and an IP network controller and an optical network controller are constructed, to respectively control an IP layer dynamic network and an optical layer dynamic network.

Specifically, the IP network controller collects an IP layer dynamic topology by using a protocol such as border gateway protocol link-state (border gateway protocol link-state, BGP-LS), and may specifically obtain link state information of the IP layer, for example, a link state database (link state database, LSDB) of the IP layer; and computes and establishes an IP layer tunnel by using a protocol such as a path computation element protocol (path computation element protocol, PCEP). The optical network controller collects an optical layer dynamic topology by using a protocol such as a generalized multiprotocol label switching (generalized multiprotocol label switching, GMPLS) protocol, and may specifically obtain link state information of the optical layer, for example, an LSDB of the optical layer; and computes and establishes an optical layer tunnel by using a protocol such as the PCEP and the GMPLS.

For example, the IP layer tunnel may include a label switched path (label switched path, LSP) based on a label distribution protocol (label distribution protocol, LDP), an LSP based on a resource reservation protocol (resource reservation protocol, RSVP), an LSP based on segment routing (segment routing, SR), a static LSP, and the like. The optical layer tunnel may include a wavelength switched optical network (wavelength switched optical network, WSON) tunnel of the optical layer, an automatically switched optical network (automatically switched optical network, ASON) tunnel of the electrical layer, and the like In this disclosure, a single-layer network (the IP network or the optical network) may be understood as a graph including points and lines, and each line on the graph has a corresponding weight. Generally, this weighted directed graph is represented by using an LSDB. The LSDB herein may include information indicating a link attribute, for example, may include link attributes such as a weight, a bandwidth, a reserved bandwidth, current actual traffic, a remaining bandwidth, an affinity attribute, a latency, a packet loss, and jittering. The LSDB may be dynamically refreshed in real time. The LSDB changes with any change of the network, for example, a link is disconnected, a node attribute is changed through configuration, or service provisioning occupies a remaining bandwidth. In other words, only real-time refreshing of the LSDB can ensure that tunnel paths computed by the IP network controller and the optical network controller based on the LSDB are correct and effective.

The affinity attribute may be understood as an attribute of a link. It is assumed that there are 10 links, affinity attributes of five links are set to red, and affinity attributes of the other five links are set to green. In this case, when establishing a tunnel, the IP network controller and/or the optical network controller may set an affinity attribute of the tunnel, for example, require that the tunnel pass only through a red link. In this way, setting an affinity attribute can limit a path of a tunnel to including only some links on a network.

On an actual physical network, an IP network and an optical network are one connected topology and carry almost same service traffic. If two network controllers manage one network in a layered manner, no optimal communication tunnel can be obtained. This may cause problems such as a protection failure and a waste of an optical layer resource.

Figure 2:
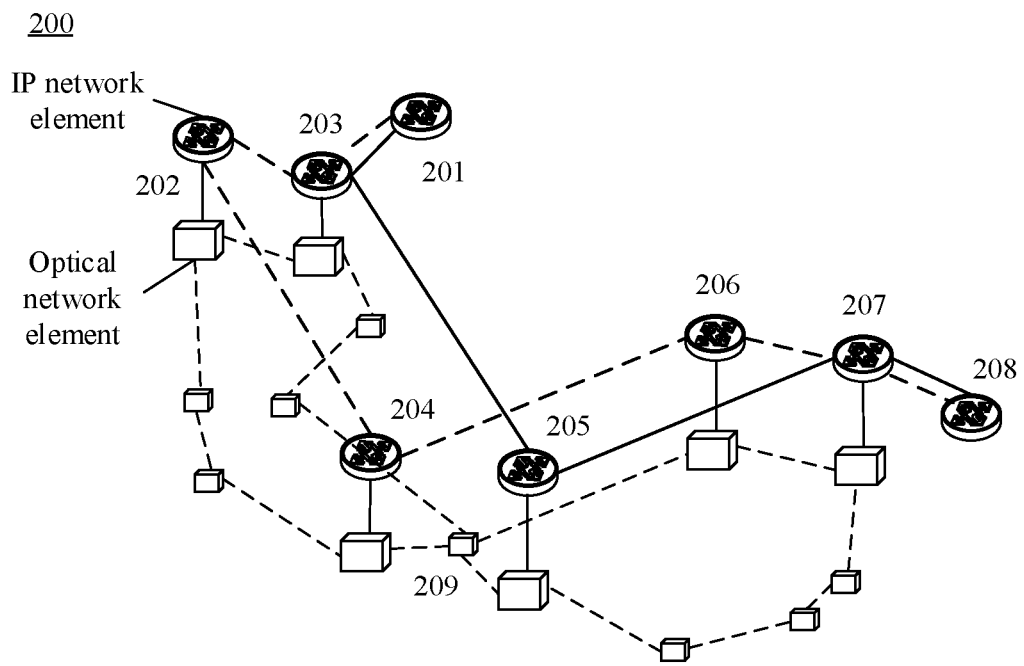
FIG. 2 is a schematic diagram of an application scenario of this disclosure.

For the problem of the protection failure, for example, in a scenario shown in FIG. 2, the optical network element may provide a single-hop IP link tunnel for the IP network element. A primary path of an IP layer tunnel is 201→203→205→207→208, and a secondary path of the IP layer tunnel is 201→203→202→204→206→207→208.

From the perspective of the IP layer, because neither of the IP network elements 201 and 208 is connected to an optical network element, that is, there is no optical layer tunnel under a link 201→203 and a link 207→208, except for the first and last links, a primary path and a secondary path of an intermediate link are separated. However, actually, the primary path and the secondary path of the IP layer tunnel are co-routed on a network element at the optical layer, for example, an optical network element 209 in FIG. 2. In other words, both the primary path and the secondary path need to pass through the optical network element 209 at the optical layer. If the optical network element 209 is faulty, both the primary path and the secondary path of the IP tunnel are faulty. As a result, the protection failure is caused, and data transmission cannot be performed.

Figure 3:
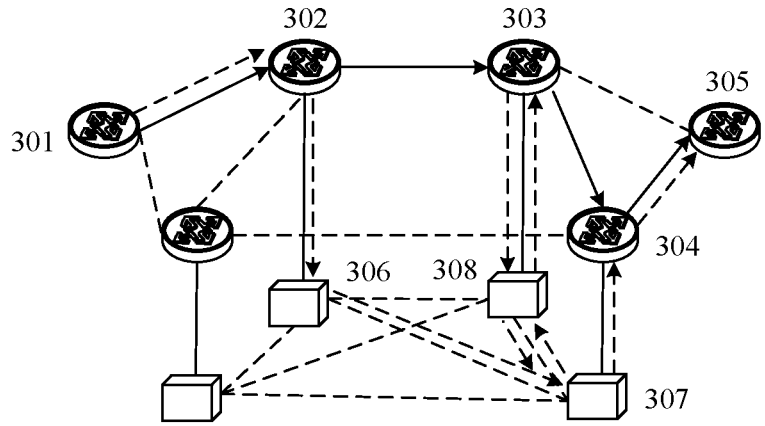
FIG. 3 is a schematic diagram of another application scenario of this disclosure.

For the problem of the waste of the optical layer resource, for example, in a scenario shown in FIG. 3, a path of an IP layer tunnel is 301→302→303→304→305. From the perspective of the IP layer, traffic is directly transmitted from 302 to 303. However, a path that needs to be passed through at the optical layer is 302→306→307→308→303. Because a next-hop node of 303 at the IP layer is 304, a path that traffic needs to pass through from 303 to 304 at the optical layer is 303→308→307→304. In this case, optical layer detouring occurs, and the waste of the optical layer resource is caused.

In view of this, this disclosure provides a network control method, an apparatus, and a system, to manage an IP network and an optical network together, thereby properly controlling use of resources of an entire network.

Figure 4:
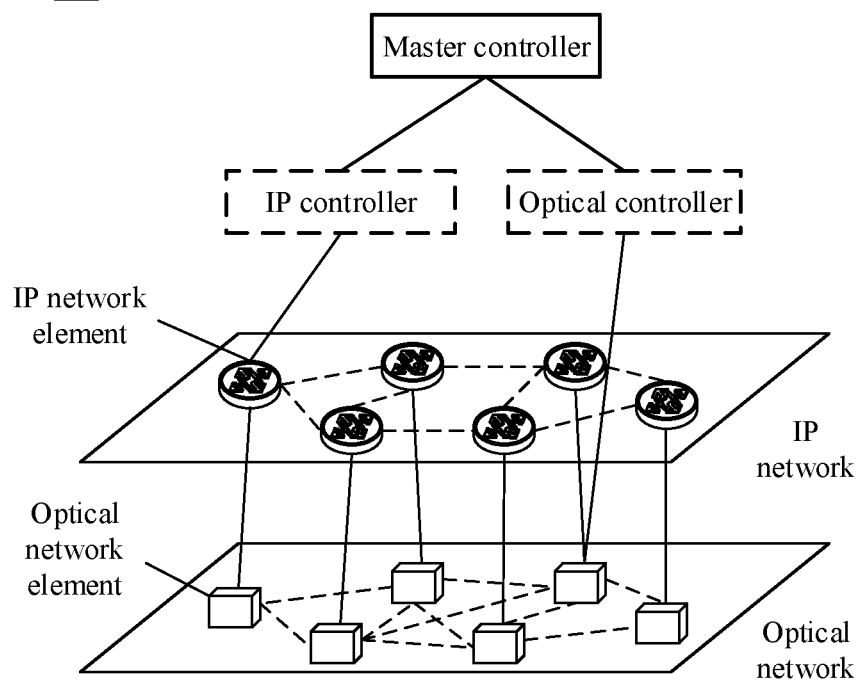
FIG. 4 is a schematic diagram of a system architecture of this disclosure.

FIG. 4 is a schematic diagram of a system architecture 400 according to an embodiment of this disclosure. The system architecture 400 may include:

1) IP network, including IP network elements, where the IP network element may be a switch, a router, or the like.

2) Optical network, including optical network elements, where the optical network element may be an OTN device, a WDM device, or the like.

3) Cross-layer link, configured to connect an IP network element and an optical network element.

4) Master controller, configured to obtain first link state information and second link state information, where the first link state information is used to indicate a link state of the IP network, and the second link state information is used to indicate a link state of the optical network; determine third link state information based on the first link state information and the second link state information, where the third link state information includes the link state of the IP network and the link state of the optical network; and compute a path based on the third link state information.

Optionally, the computing a path may specifically include computing a tunnel path. Further, the master controller may establish a tunnel based on the computed tunnel path. The master controller may further perform tunnel rerouting or tunnel optimization with reference to existing tunnel information and the computed tunnel path. This is not limited in this embodiment of this disclosure.

Optionally, the system architecture 400 may further include:

5) IP network controller, configured to collect the first link state information in real time, and send the first link state information to the master controller.

6) Optical network controller, configured to collect the second link state information in real time, and send the second link state information to the master controller.

In this case, the master controller may be separately connected to the IP network controller and the optical network controller by using a communications interface, to obtain the first link state information from the IP network controller, and obtain the second link state information from the optical network controller. Optionally, the IP network controller may obtain existing tunnel information of the IP network, and the optical network controller may obtain existing tunnel information of the optical network. Further, the master controller may separately obtain the existing tunnel information of the IP network from the IP network controller by using the communications interface, and obtain the existing tunnel information of the optical network from the optical network device controller by using the communications interface. The existing tunnel information of the IP network and the existing tunnel information of the optical network are collectively referred to as the existing tunnel information. The master controller may compute a new tunnel path based on the existing tunnel information, and perform tunnel rerouting and/or tunnel optimization on an existing tunnel.

It should be understood that first, second, and various numerical references in this disclosure are merely for differentiation and for ease of description, but are not used to limit the scope of the embodiments of this disclosure, for example, differentiating between different link state information. For example, the first link state information may be alternatively referred to as link state information of an IP layer, link state information of the IP network, or another name, the second link state information may be alternatively referred to as link state information of an optical layer, link state information of the optical network, or another name, and the third link state information may be alternatively referred to as total link state information, cross-layer link state information, or another name. This is not limited in this embodiment of this disclosure.

Optionally, the IP network controller, the optical network controller, and the master controller may be separately deployed, for example, deployed in three different devices. In this case, an extensible protocol needs to be deployed between the IP network controller and the master controller, and between the optical network controller and the master controller, so that the master controller obtains the link state information and the existing tunnel information, and the IP network controller and the optical network controller obtain the respective link state information and the existing tunnel information of the respective layers.

Optionally, the IP network controller, the optical network controller, and the master controller may be deployed together, for example, deployed in a same device. In this case, the IP network controller and the master controller obtain information about each other only by using an internal software function interface of a system, the optical network controller and the master controller obtain information about each other only by using an internal software function interface of the system, and no other extensible protocol needs to be deployed.

FIG. 5 is a schematic flowchart of a network control method 500 according to an embodiment of this disclosure. The method may be applied to the system architecture 400, or may be applied to another system architecture. This is not limited in this embodiment of this disclosure. The method may be performed by the master controller in the system architecture 400.

S510: Obtain first link state information and second link state information, where the first link state information is used to indicate a link state of an IP network, and the second link state information is used to indicate a link state of an optical network.

S520: Determine third link state information based on the first link state information and the second link state information, where the third link state information includes the link state of the IP network and the link state of the optical network.

S530: Compute a path based on the third link state information.

In this embodiment of this disclosure, the third link state information includes the link state information of the IP network and the link state information of the optical network. In other words, the third link state information is obtained after the link state of the IP network and the link state of the optical network are combined. Path planning is performed based on the third link state information, so that problems of a protection failure and a waste of an optical layer resource can be resolved.

For example, because both the link state of the IP layer and the link state of the optical layer are considered during path planning, a primary path and a secondary path that are not co-routed at either the IP layer or the optical layer (that is, there is no common network element) may be planned, and a case in which the primary path and the secondary path are not co-routed at the IP layer, but actually are co-routed at the optical layer does not exist, thereby resolving the problem of the protection failure. FIG. 2 is used as an example. If the planned primary path includes an optical network element 209, the optical network element 209 may be avoided during planning of the secondary path. In other words, each network element on the primary path needs to be avoided during planning of the secondary path. In this way, no protection failure is caused.

For another example, because both the link state of the IP layer and the link state of the optical layer are considered during path planning, a planned path includes each network element at the IP layer and the optical layer, and there is no optical layer detouring, thereby resolving the problem of the waste of the optical layer resource. FIG. 3 is used as an example. According to the method in this embodiment of this disclosure, the planned path may be 301→302→306→307→304→305. In this way, no optical layer resource is wasted.

Therefore, according to the network control method in this embodiment of this disclosure, the link state information of the IP network and the link state information of the optical network are combined, and the master controller performs management together, to facilitate the master controller in properly planning a path, thereby properly controlling use of resources of an entire network, and helping resolve the problems of the protection failure and the resource waste.

Optionally, the link state information may be stored in a link state database. For example, the first link state information may be stored in a first link state database, and the second link information may be stored in a second link state database. The computing a path may specifically include computing a tunnel path. However, this is not limited in this embodiment of this disclosure.

In an optional embodiment, the link state of the IP network includes a network topology of the IP network, and the link state of the optical network includes a network topology of the optical network.

Specifically, the master controller may obtain the link state information (namely, the first link state information) of the IP network and the link state information (namely, the second link state information) of the optical network, and then integrate the two together to obtain the third link state information. The third link state information includes the link state of the IP network and the link state of the optical network.

Figure 6:
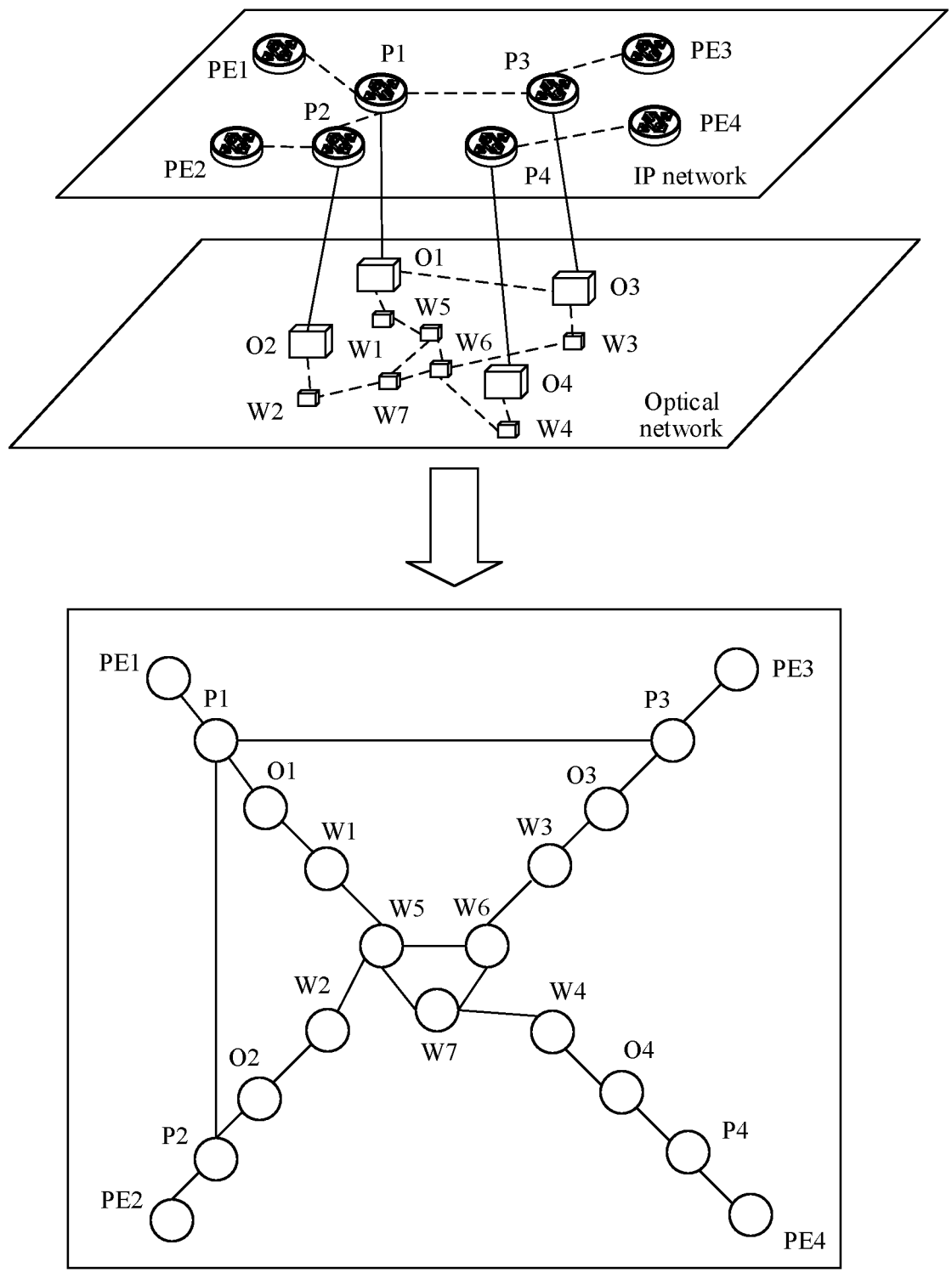
FIG. 6 is a schematic diagram of a network topology of a network control method according to this disclosure.

FIG. 6 is a schematic diagram of a network topology using the network control method provided in this embodiment of this disclosure. The IP network includes eight IP network elements: PE1, PE2, PE3, PE4, P1, P2, P3, and P4. The optical network includes 11 optical network elements: O1, O2, O3, O4, W1, W2, W3, W4, W5, W6, and W7. PE1, PE2, PE3, and PE4 are edge devices and none of PE1, PE2, PE3, and PE4 is connected to an optical network element. P1, P2, P3, and P4 are in a one-to-one correspondence with O1, O2, O3, and O4, and P1, P2, P3, and P4 are respectively connected to O1, O2, O3, and O4 by using cross-layer links. A specific network topology is shown in FIG. 6, and no enumeration is provided herein. For the network topology shown in FIG. 6, the third link information may be specifically shown in Table 1.

TABLE 1

| Link | Type | Attribute | Management location |
|---|---|---|---|
| PE1 –> P1 | Direct IP link | Time consumption, remaining bandwidth, latency, affinity attribute | Master controller |
| PE2 –> P2 | Direct IP link | Time consumption, remaining bandwidth, latency, affinity attribute | Master controller |
| PE3 –> P3 | Direct IP link | Time consumption, remaining bandwidth, latency, affinity attribute | Master controller |
| PE4 –> P4 | Direct IP link | Time consumption, remaining bandwidth, latency, affinity attribute | Master controller |
| P1 –> P2 | Activated IP link | Time consumption, remaining bandwidth, latency, affinity attribute | Master controller |
| P1 –> P3 | Activated IP link | Time consumption, remaining bandwidth, latency, affinity attribute | Master controller |
| P1 –> O1 | Inter-layer link | Remaining bandwidth | Master controller |
| P2 –> O2 | Inter-layer link | Remaining bandwidth | Master controller |
| P3 –> O3 | Inter-layer link | Remaining bandwidth | Master controller |
| P4 –> O4 | Inter-layer link | Remaining bandwidth | Master controller |
| O1 –> W1 | OPS link | Remaining slot | Master controller |
| O2 –> W2 | OPS link | Remaining slot | Master controller |
| O3 –> W3 | OPS link | Remaining slot | Master |

TABLE 1-continued

| Link | Type | Attribute | Management location |
|---|---|---|---|
| O4 -> W4 | OPS link | Remaining slot | Master controller |
| W1 -> W5 | OTS link | Remaining wavelength, time consumption, latency | Master controller |
| W2 -> W7 | OTS link | Remaining wavelength, time consumption, latency | Master controller |
| W3 -> W6 | OTS link | Remaining wavelength, time consumption, latency | Master controller |
| W4 -> W6 | OTS link | Remaining wavelength, time consumption, latency | Master controller |

A direct IP link is a link formed by directly connecting two IP network elements by using one physical optical fiber. An activated IP link is a link formed by connecting two IP network elements by using an optical layer pipeline. It should be understood that the activated IP link is for a case in which two IP network elements cannot be directly connected by using one optical fiber because a distance between the two IP network elements is relatively large. An inter-layer link represents a link between the IP layer and the optical layer, an OPS link is an optical physical section (optical physical section, OPS) link, and an OTS link is an optical transmission section (optical transmission section, OTS) link.

In an optional embodiment, the obtaining first link state information and second link state information includes: receiving the first link state information from an IP network controller; and receiving the second link state information from an optical network controller.

For example, the IP network controller and the optical network controller may collect statistics on the respective link state information in real time, and report the respective link state information to the master controller by using extensible protocols.

In an optional embodiment, the computing a path based on the third link state information includes: computing a tunnel path based on the third link state information; and the method further includes: establishing a tunnel based on the tunnel path.

Specifically, after computing the tunnel path, the master controller needs to send information about the tunnel path to the networks (the IP network and the optical network), to ensure information synchronization between the networks and the master controller. In this embodiment of this disclosure, the tunnel path is a tunnel path computed from nothing. Optionally, if the IP network controller and the optical network controller exist, the master controller may send the tunnel path to the IP network controller and the optical network controller, and the IP network controller and the optical network controller establish respective tunnels.

In an optional embodiment, the method further includes: obtaining existing tunnel information; the computing a path based on the third link state information includes: computing a tunnel path based on the third link state information and the existing tunnel information; and the method further includes: performing tunnel rerouting and/or tunnel optimization based on the tunnel path and the existing tunnel information.

Further, the master controller may obtain the existing tunnel information, compute the tunnel path with reference to the third link state information and the existing tunnel information, and perform tunnel rerouting and/or tunnel optimization on an existing tunnel. In this embodiment of this disclosure, the tunnel path is a better tunnel path computed based on an existing tunnel path. When the IP network controller, the optical network controller, and the master controller may be separately deployed, that the master controller obtains the existing tunnel information may be: separately obtaining existing tunnel information of the IP network by using the IP network controller, and obtaining existing tunnel information of the optical network by using the optical network controller. In this embodiment of this disclosure, the existing tunnel information of the IP network and the existing tunnel information of the optical network may be collectively referred to as the existing tunnel information, and a name of the existing tunnel information is not limited in this embodiment of this disclosure.

In an optional embodiment, before the obtaining first link state information and second link state information, the method further includes: receiving a service request (for example, a virtual private network (virtual private network, VPN) request), and computing the tunnel path based on the service request.

In a possible implementation, the service request may include a source-sink request, namely, requesting to establish a tunnel from a source node to a sink node.

In a possible implementation, the service request may include a protection request, namely, requesting to provision a protection path for a service (the protection path may be enabled at the same time when a working path is provisioned). When the working path is faulty, traffic may be forwarded by using the protection path.

In a possible implementation, the service request may include a service level agreement (service level agreement, SLA) request, namely, a constraint on a service, for example, requesting to provision a service requiring a 100 M bandwidth and a latency being less than 50 ms.

In this embodiment of this disclosure, the master controller may compute a proper tunnel path with reference to the third link state information and a requirement of a user, to properly control use of resources of an entire network, thereby resolving the problems of the protection failure and the resource waste, meeting the requirement of the user, and improving system efficiency.

It should be understood that sequence numbers of the foregoing processes do not mean execution sequences. The execution sequences of the processes should be determined based on functions and internal logic of the processes, and should not be construed as any limitation on the implementation processes of the embodiments of the present invention.

The apparatus in the embodiments of this disclosure is described in detail below with reference to FIG. 7 and FIG. 8.

Figure 7:
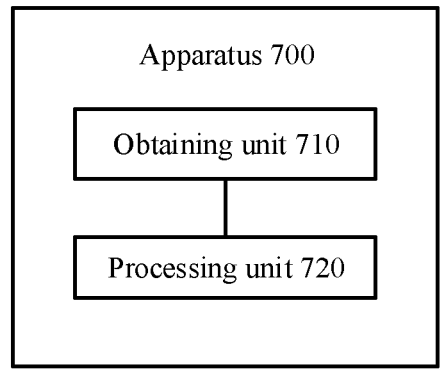
FIG. 7 is a schematic structural diagram of an apparatus according to this disclosure.

FIG. 7 shows an apparatus 700 according to an embodiment of this disclosure. The apparatus 700 may be a master controller, or may be an apparatus that can support the master controller in implementing a function of the master controller, for example, may be a chip or a chip system that may be used in the master controller. The apparatus 700 includes an obtaining unit 710 and a processing unit 720.

The obtaining unit 710 is configured to obtain first link state information and second link state information, where the first link state information is used to indicate a link state attribute of an IP network, and the second link state information is used to indicate a link state attribute of an optical network.

The processing unit 720 is configured to determine third link state information based on the first link state information and the second link state information, where the third link state information includes the link state attribute of the IP network and the link state attribute of the optical network; and compute a path based on the third link state information.

According to the apparatus in this embodiment of this disclosure, the link state information of the IP network and the link state information of the optical network are combined, and the master controller performs management together, to facilitate the master controller in properly planning a tunnel path, thereby properly controlling use of resources of an entire network, and helping resolve problems of a protection failure and a resource waste.

Optionally, the link state of the IP network includes a network topology of the IP network, and the link state of the optical network includes a network topology of the optical network.

Optionally, the obtaining unit 710 is specifically configured to receive the first link state information from an IP network controller and receive the second link state information from an optical network controller.

Optionally, the processing unit 720 is further configured to compute a tunnel path based on the third link state information; and establish a tunnel based on the tunnel path.

Optionally, the processing unit 720 is further configured to obtain existing tunnel information; compute a tunnel path based on the third link state information and the existing tunnel information; and perform tunnel rerouting and/or tunnel optimization based on the tunnel path and the existing tunnel information.

It should be understood that the apparatus 700 herein is embodied in a form of a functional unit. The term "unit" herein may refer to an application specific integrated circuit (application specific integrated circuit, ASIC), an electronic circuit, a processor (for example, a shared processor, a dedicated processor, or a group processor) configured to execute one or more software or firmware programs and a memory, a combined logic circuit, and/or another appropriate component that supports the described function. In an optional example, a person skilled in the art may understand that the apparatus 700 may be specifically the master controller in the foregoing embodiment, and the apparatus 700 may be configured to perform processes and/or steps corresponding to the master controller in the foregoing method embodiment. To avoid repetition, details are not described herein again.

The apparatus 700 in the foregoing solution has a function of implementing corresponding steps performed by the master controller in the foregoing method. The function may be implemented by hardware, or by hardware executing corresponding software. The hardware or the software includes one or more modules corresponding to the foregoing function. For example, a sending unit and a receiving unit may be replaced by a communications interface, and another unit such as a determining unit may be replaced by a processor, to separately perform receiving and sending operations and a related processing operation in each method embodiment. In this embodiment of this disclosure, the communications interface may be an apparatus that can implement a communication function, for example, a circuit, a module, a bus, a bus interface, or a transceiver.

In this embodiment of this disclosure, the apparatus in FIG. 7 may be alternatively a chip or a chip system, for example, a system on chip (system on chip, SoC). Correspondingly, the receiving unit and the sending unit may be a transceiver circuit of the chip. This is not limited herein.

Figure 8:
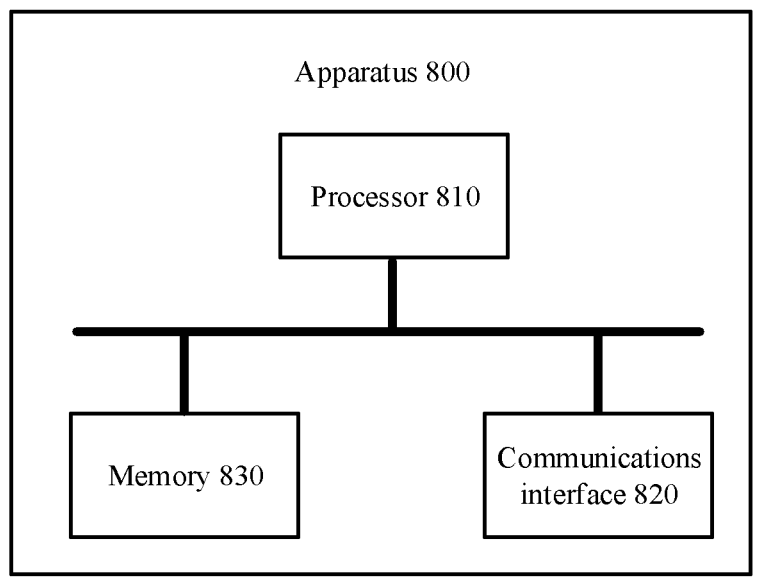
FIG. 8 is a schematic structural diagram of another apparatus according to this disclosure.

FIG. 8 shows another apparatus 800 according to an embodiment of this disclosure. The apparatus 800 includes a processor 810 and a communications interface 820. Optionally, the apparatus 800 may further include a memory 830. Optionally, the memory 830 may be included in the processor 810. The processor 810, the communications interface 820, and the memory 830 communicate with each other by using an internal connection path. The memory 830 is configured to store instructions. The processor 810 is configured to execute the instructions stored in the memory 830, to implement the method provided in the embodiments of this disclosure.

The communications interface 820 is configured to obtain first link state information and second link state information, where the first link state information is used to indicate a link state attribute of an IP network, and the second link state information is used to indicate a link state attribute of an optical network. The processor 810 is configured to determine third link state information based on the first link state information and the second link state information, where the third link state information includes the link state attribute of the IP network and the link state attribute of the optical network; and compute a path based on the third link state information.

Optionally, the link state of the IP network includes a network topology of the IP network, and the link state of the optical network includes a network topology of the optical network.

Optionally, the communications interface 820 is specifically configured to receive the first link state information from an IP network controller and receive the second link state information from an optical network controller.

Optionally, the processor 810 is further configured to compute a tunnel path based on the third link state information; and establish a tunnel based on the tunnel path.

Optionally, the processor 810 is further configured to obtain existing tunnel information; compute a tunnel path based on the third link state information and the existing tunnel information; and perform tunnel rerouting and/or tunnel optimization based on the tunnel path and the existing tunnel information.

It should be understood that the apparatus 800 may be specifically the master controller in the foregoing embodiments, and may be configured to perform steps and/or processes corresponding to the master controller in the method embodiment. Optionally, the memory 830 may include a read-only memory and a random access memory, and provide instructions and data to the processor. A part of the memory may further include a non-volatile random access memory. For example, the memory may further store information of a device type. The processor 810 may be configured to execute the instructions stored in the memory. When the processor 810 executes the instructions stored in the memory, the processor 810 is configured to perform the steps and/or processes corresponding to the terminal device or the network device in the method embodiment.

It should be understood that in this embodiment of this disclosure, the processor in the foregoing apparatus may be a central processing unit (central processing unit, CPU), or the processor may be another general purpose processor, a digital signal processor (DSP), an application specific integrated circuit (ASIC), a field programmable gate array (FPGA), or another programmable logic device, a discrete gate or a transistor logic device, a discrete hardware component, or the like. The general purpose processor may be a microprocessor, or the processor may be any conventional processor or the like.

In an implementation process, steps in the foregoing method may be implemented by using an integrated logic circuit in a form of hardware in the processor, or by using instructions in a form of software. The steps of the method disclosed with reference to the embodiments of this disclosure may be directly performed by a hardware processor, or may be performed by using a combination of hardware in the processor and a software unit. The software unit may be located in a mature storage medium in the art, for example, a random access memory, a flash memory, a read-only memory, a programmable read-only memory, an electrically erasable programmable memory, or a register. The storage medium is located in the memory, and the processor reads the instructions in the memory and completes, together with hardware of the processor, the steps in the foregoing method. To avoid repetition, details are not described herein again.

In this disclosure, "at least one" means one or more, and "a plurality of" means two or more. The term "and/or" describes an association relationship of associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one of the following" or a similar expression means any combination of the items, including a single item or any combination of a plurality of items. For example, at least one of a, b, or c may represent a, b, c, a-b, a-c, b-c, or a-b-c, where a, b, c each may be in a singular form or a plural form.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again. In the embodiments of this disclosure, the embodiments may be mutually referenced provided that there is no logic contradiction. For example, methods and/or terms in the method embodiments may be mutually referenced. For example, functions and/or terms in the apparatus embodiments may be mutually referenced. For example, functions and/or terms in the apparatus embodiments and the method embodiments may be mutually referenced.

In the several embodiments provided in this disclosure, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces, indirect couplings or communications connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this disclosure.

In addition, function units in the embodiments of this disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium.

All or some of the foregoing methods in the embodiments of this disclosure may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this disclosure are all or partially generated. The computer may be a general-purpose computer, a dedicated computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

The foregoing descriptions are merely specific embodiments of this disclosure, but are not intended to limit the protection scope of this disclosure. Any modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
   obtaining first link state information and second link state information, wherein the first link state information indicates a link state of an Internet Protocol (IP) network, and the second link state information indicates a link state of an optical network;

determining third link state information based on the first link state information and the second link state information, wherein the third link state information comprises the link state of the IP network and the link state of the optical network;
computing and selecting a path based on the third link state information to avoid protection failure or to reduce resource waste;
obtaining existing tunnel information;
computing the tunnel path based on the third link state information and the existing tunnel information; and
performing tunnel rerouting and/or tunnel optimization based on the tunnel path and the existing tunnel information.

2. The method according to claim 1, wherein the link state of the IP network comprises a network topology of the IP network and the link state of the optical network comprises a network topology of the optical network.

3. The method according to claim 1, wherein the obtaining first link state information and second link state information comprises:
receiving the first link state information from an IP network controller; and
receiving the second link state information from an optical network controller.

4. The method according to claim 1 wherein the computing a path based on the third link state information comprises:
computing a tunnel path based on the third link state information; and
establishing a tunnel based on the tunnel path.

5. An apparatus, comprising:
at least one processor;
one or more memories coupled to the at least one processor and storing instructions for execution by the at least one processor, the instructions executed by the at least one processor to cause the apparatus to:
obtain first link state information and second link state information, wherein the first link state information indicates a link state of an Internet Protocol (IP) network, and the second link state information indicates a link state of an optical network; and
determine third link state information based on the first link state information and the second link state information, wherein the third link state information comprises the link state of the IP network and the link state of the optical network;
compute and select a path based on the third link state information to avoid protection failure or to reduce resource waste;
obtaining existing tunnel information;
computing the tunnel path based on the third link state information and the existing tunnel information; and
performing tunnel rerouting and/or tunnel optimization based on the tunnel path and the existing tunnel information.

6. The apparatus according to claim 5, wherein the link state of the IP network comprises a network topology of the IP network and the link state of the optical network comprises a network topology of the optical network.

7. The apparatus according to claim 5, wherein the instructions executed by the at least one processor further causes the apparatus to:
receive the first link state information from an IP network controller; and
receive the second link state information from an optical network controller.

8. The apparatus according to claim 5, wherein the instructions executed by the at least one processor further causes the apparatus to:
compute a tunnel path based on the third link state information; and
establish a tunnel based on the tunnel path.

9. A system, comprising:
an Internet Protocol (IP) network, comprising IP network elements;
an optical network, comprising optical network elements;
a cross-layer link, configured to connect the IP network element and the optical network element; and
a master controller, configured to obtain first link state information and second link state information, wherein the first link state information indicates a link state of the IP network, and the second link state information indicates a link state of the optical network; determine third link state information based on the first link state information and the second link state information, wherein the third link state information comprises the link state of the IP network and the link state of the optical network;
compute and select a path based on the third link state information to avoid protection failure or to reduce resource waste;
obtain existing tunnel information;
compute the tunnel path based on the third link state information and the existing tunnel information; and
perform tunnel rerouting and/or tunnel optimization based on the tunnel path and the existing tunnel information.

10. The system according to claim 9, wherein the link state of the IP network comprises a network topology of the IP network and the link state of the optical network comprises a network topology of the optical network.

11. The system according to claim 9, wherein the system further comprises:
an IP network controller, configured to collect the first link state information in real time, and send the first link state information to the master controller; and
an optical network controller, configured to collect the second link state information in real time, and send the second link state information to the master controller, wherein the master controller is configured to:
receive the first link state information from the IP network controller; and
receive the second link state information from the optical network controller.

12. The system according to claim 9, wherein the master controller is further configured to:
compute a tunnel path based on the third link state information; and
establish a tunnel based on the tunnel path.

13. A non-transitory storage medium storing a program that is executable by one or more processors, the program including instructions for:
obtaining first link state information and second link state information, wherein the first link state information indicates a link state of an Internet Protocol (IP) network, and the second link state information indicates a link state of an optical network;
determining third link state information based on the first link state information and the second link state information, wherein the third link state information comprises the link state of the IP network and the link state of the optical network;

computing and selecting a path based on the third link state information to avoid protection failure or to reduce resource waste;

obtaining existing tunnel information;

computing the tunnel path based on the third link state information and the existing tunnel information; and performing tunnel rerouting and/or tunnel optimization based on the tunnel path and the existing tunnel information.

14. The non-transitory storage medium according to claim 13, wherein the link state of the IP network comprises a network topology of the IP network and the link state of the optical network comprises a network topology of the optical network.

15. The non-transitory storage medium according to claim 13, wherein the program is executable by one or more processors, the program including further instructions for:
receiving the first link state information from an IP network controller; and
receiving the second link state information from an optical network controller.

16. The non-transitory storage medium according to claim 13, wherein the program is executable by one or more processors, the program including further instructions for:
computing a tunnel path based on the third link state information; and
establishing a tunnel based on the tunnel path.

* * * * *